United States Patent
Wachinger et al.

(10) Patent No.: US 11,714,067 B2
(45) Date of Patent: Aug. 1, 2023

(54) CAPILLARY TUBE CONNECTION

(71) Applicant: DIONEX SOFTRON GMBH, Germering (DE)

(72) Inventors: Thomas Wachinger, Altomuenster (DE); Daniel Buerger, Raisting (DE)

(73) Assignee: Dionex Softron GmbH, Gemering (DE)

( * ) Notice: Subject to any disclaimer, the term of this patent is extended or adjusted under 35 U.S.C. 154(b) by 130 days.

(21) Appl. No.: 17/218,018

(22) Filed: Mar. 30, 2021

(65) Prior Publication Data

US 2021/0215648 A1    Jul. 15, 2021

Related U.S. Application Data (63) Continuation of application No. 15/337,793, filed on Oct. 28, 2016, now Pat. No. 10,969,369.

(30) Foreign Application Priority Data

Oct. 30, 2015  (EP) .................................. 15192417
Mar. 1, 2016   (EP) .................................. 16158074

(51) Int. Cl.
  *G01N 30/60*   (2006.01)
  *F16L 19/02*   (2006.01)

(52) U.S. Cl.
  CPC ...... *G01N 30/6026* (2013.01); *F16L 19/0206* (2013.01); *F16L 19/0212* (2013.01); *G01N 30/6039* (2013.01)

(58) Field of Classification Search
  CPC ........... G01N 30/6026; G01N 30/6034; G01N 30/6039; F16L 19/0206; F16L 19/0212
  USPC .............................. 285/246, 342; 210/198.2
  See application file for complete search history.

(56) References Cited

U.S. PATENT DOCUMENTS

| | | |
|---|---|---|
| 3,804,126 A | 4/1974 | Haferer |
| 3,880,452 A | 4/1975 | Fields |
| 4,083,702 A | 4/1978 | Hartigan et al. |
| 4,602,809 A | 7/1986 | Ross et al. |
| 4,619,473 A | 10/1986 | Someya et al. |
| 4,690,437 A | 9/1987 | Anderson, Jr. |
| 4,776,618 A | 10/1988 | Barree |
| 4,792,396 A | 12/1988 | Gundelfinger |

(Continued)

FOREIGN PATENT DOCUMENTS

| | | |
|---|---|---|
| CN | 2087340 U | 10/1991 |
| CN | 1477391 A | 2/2004 |

(Continued)

OTHER PUBLICATIONS

Batts, "All About Fittings," 17 pgs., 2003.

(Continued)

*Primary Examiner* — Zachary T Dragicevich (57) ABSTRACT

A plug for connecting capillaries includes at least one capillary tube, at least one sealing, and at least one pressure piece. The capillary tube includes a first inner diameter and an open end section. The sealing includes a second inner diameter, a first end section and a shape adapted to seal the open end section of the capillary tube when connected. The pressure piece is adapted to exert at least axial pressure and/or force to at least a part of the sealing. The pressure piece is also adapted to host the first end section of the sealing in abutment with the open end section of the capillary tube so that the capillary tube and the sealing are aligned.

27 Claims, 4 Drawing Sheets

(56) References Cited

U.S. PATENT DOCUMENTS

| | | | |
|---|---|---|---|
| 4,865,363 | A | 9/1989 | Takahashi |
| 4,968,421 | A | 11/1990 | Spacek et al. |
| 4,991,883 | A | 2/1991 | Worden et al. |
| 5,188,730 | A | 2/1993 | Kronwald |
| 5,194,225 | A | 3/1993 | Mueller et al. |
| 5,215,340 | A | 6/1993 | Ledford, Jr. |
| 5,494,641 | A | 2/1996 | Krstanovic |
| 5,578,157 | A | 11/1996 | Higdon |
| 5,601,785 | A | 2/1997 | Higdon |
| 5,669,637 | A | 9/1997 | Chitty et al. |
| 6,273,478 | B1 | 8/2001 | Benett et al. |
| 6,319,476 | B1 | 11/2001 | Victor et al. |
| 6,494,500 | B1 | 12/2002 | Todosiev et al. |
| 6,926,313 | B1 | 8/2005 | Renzi |
| 8,371,621 | B2 | 1/2013 | Funke |
| 8,931,808 | B2 | 1/2015 | Graham |
| 9,091,693 | B2 | 7/2015 | Hochgraeber et al. |
| 9,217,522 | B1 | 12/2015 | Best |
| 9,388,930 | B2 | 7/2016 | Servin |
| 9,671,048 | B2 | 6/2017 | Graham et al. |
| 10,067,102 | B2 | 9/2018 | Hochgraeber et al. |
| 10,444,205 | B2 | 10/2019 | Hochgraeber et al. |
| 2006/0113794 | A1 | 6/2006 | Plant et al. |
| 2011/0025047 | A1 | 2/2011 | Zelechonok et al. |
| 2011/0298210 | A1 | 12/2011 | Hochgraeber et al. |
| 2012/0024411 | A1 | 2/2012 | Hahn et al. |
| 2012/0119491 | A1 | 5/2012 | Roesch et al. |
| 2014/0131997 | A1 | 5/2014 | Bürger et al. |
| 2015/0090595 | A1 | 4/2015 | Lueth et al. |
| 2015/0233503 | A1 | 4/2015 | Reinhardt et al. |
| 2016/0116088 | A1 | 4/2016 | Graham et al. |

FOREIGN PATENT DOCUMENTS

| | | |
|---|---|---|
| DE | 4242102 A1 | 12/1993 |
| DE | 102008023327 A1 | 11/2009 |
| DE | 102009022368 A1 | 11/2010 |
| DE | 102011082470 A1 | 3/2013 |
| EP | 0978292 B1 | 10/2003 |
| EP | 1457775 B1 | 10/2006 |
| EP | 2516912 B1 | 4/2015 |
| WO | 9815824 A1 | 4/1998 |
| WO | 9932821 A1 | 7/1999 |
| WO | 0116517 A1 | 3/2001 |
| WO | 2010133192 A1 | 11/2010 |

OTHER PUBLICATIONS

Decision in nullity suit against DE 10 2009 022 368, Jun. 27, 2018, 57 pages {English translation}.
Dionex Nullity Suit Submission, 4 pgs, Jan. 12, 2018.
Exhibit K15 (Letter dated Jun. 21, 2012 from Eder & Schieschke to the EPO; 5 pgs.) from Nullity suit against DE 10 2009 022 368 Jan. 13, 2017.
Exhibit K16 (claim amendments; 3 pgs.) from Nullity suit against DE 10 2009 022 368 Jan. 13, 2017 (in German, no English translation available).
Exhibit K17 (Kapillaritaet—from Wikipedia—https://de.wikipedia.org/wiki/Kapillaritaet#Formei_.28Kapillargleichung.29; 4 pgs.) from Nullity suit against DE 10 2009 022 368 Jan. 13, 2017 (in German, no English translation available).
Exhibit K18 (Kanuele—from Wikipedia—https://de.wikipedia.org/wiki/Kanuele; 5 pgs.) from Nullity suit against DE 10 2009 022 368 Jan. 13, 2017 (in German, no English translation available).
Exhibit K19 (Moeller Medical—Liquid Handling Systems—Analytik und Diagnostik; 8 pgs.) from Nullity suit against DE 10 2009 022 368 Jan. 13, 2017 (in German, no English translation available).
Exhibit K21 (Moeller Medical invoices dated Mar. 29, 2005—2 pgs.) from Nullity suit against DE 10 2009 022 368 Jan. 13, 2017 (in German, no English translation available).
Exhibit K22 (diagram; 1 pg.) from Nullity suit against DE 10 2009 022 368 Jan. 13, 2017 (in German, no English translation available).
Exhibit K9 (International Search Report and Written Opinion from PCT/DE2010/000333; 9 pgs.) from Nullity suit againsT DE 10 2009 022 368 Jan. 13, 2017 (English translation attached).
Federal Patent Court, Minutes of Oral Proceedings, 12 pgs, Feb. 27, 2018.
Federal Patent Court Preliminary Opinion, 14 pgs, Oct. 16, 2017.
Grounds of Appeal filed Oct. 30, 2018 in patent nullity action between Dionex Soflron GmbH and Moeller Medical 3mbH concerning DE 10 2009 22 368.1, English translation, 58 pages.
Idex Catalog, Super Flangeless, 2 pgs, 1994.
Idex SP02 Upchurch Katalog, 4 pgs, 2007-2008.
Moeller 2nd submission dated Jan. 25, 2018, 3 pages, English translation.
Moeller further submission, 12 pgs, Jan. 15, 2018.
Moeller Replik, 23 pgs, Jan. 13, 2017.
Nullity suit against DE 10 2009 022 368, Apr. 13, 2016, 33 pages.
Nullity suit against DE 10 2009 022 368, Dec. 19, 2016, 25 pages.

CAPILLARY TUBE CONNECTION

CROSS-REFERENCE TO RELATED APPLICATIONS

This application is a Continuation under 35 U.S.C. § 120 and claims the priority benefit of U.S. application Ser. No. 15/337,793, now U.S. Pat. No. 10,969,369 filed Oct. 28, 2016, which claims the priority benefit under 35 U.S.C. § 119 to European Patent Application No. 15192417.2, filed on Oct. 30, 2015 and European Patent Application No. 16158074.1, filed Mar. 1, 2016, the disclosures of which are incorporated herein by reference.

FIELD OF THE INVENTION

The invention relates to capillary tube connections, plugs therefor and methods of connecting capillary tubes. The invention can particularly but not exclusively be applied in the field of High-Performance Liquid Chromatography (HPLC).

BACKGROUND

In chromatography systems, liquids or gases are fed through suitable connection lines between the components of a system. These connection lines can be made, e.g., from stainless steel, have available at their ends suitable connection systems, also called fittings, in order to be able to create a tight connection with the connections of the components.

Such a connection system was already described in 1975 in U.S. Pat. No. 3,880,452. A capillary tube forming the connection line between two components is pushed into the capillary tube receptacle opening of a bushing unit or connection unit and fixed in the bushing by means of an attachment screw that has a central borehole for guiding the capillary tube. For sealing, one or more sealing elements that surround the capillary tube in their front end region are pressed into the capillary tube receptacle opening that runs conically inward by means of the attachment screw when the capillary tube and bushing unit are connected. However, the sealing position cannot be realized in the plane of the end surface perpendicular to the longitudinal axis of the capillary tube, but is instead offset to a certain rearward distance from the end surface in the axial direction. In this way, a dead volume is produced that has a disadvantageous effect, especially in high-performance liquid chromatography (HPLC).

In the case of the extremely high pressures used in high-performance liquid chromatography and in order to be able to guarantee the tightness of such connections, sealing elements are often used like those described, e.g., in U.S. Pat. No. 4,619,473. This document involves annular sealing elements that are, for a major part, likewise made from stainless steel and that have, in the longitudinal section, a conical profile of the outer diameter. Such a sealing element interacts with a conical receptacle opening in the bushing unit, wherein the conical receptacle opening has a larger angle than the sealing element relative to the longitudinal axis of the capillary tube. When in this configuration the sealing element is pressed into the receptacle opening, an extremely high, radially inward pressure is exerted by means of an attachment screw onto the front region of the sealing element, so that the sealing position is realized. Through the high pressure deformation of the sealing element and the capillary tube can be generated, wherein the sealing element is pressed with its front edge in an annular shape into the outer periphery of the capillary tube. Such a deformation is unwanted, especially because the sealing element here is connected to the capillary tube with a positive-fit and non-positive-fit connection. The sealing element can no longer be easily shifted in the axial direction onto the capillary tube. If the sealing connection is released and should such a plug element be screwed into another bushing unit, e.g., because a component of the chromatography system must be replaced, then, a tight connection can be produced, However, due to tolerances or manufacturing-dependent differences in the depth of the receptacle opening, it cannot be taken for granted that the capillary tube applies a force again with its end surface on the end surface of the line to be connected. If the receptacle opening of the bushing unit of the exchanged component is longer in the axial direction than the previously used component, then an undesired dead volume is created. If the receptacle opening for the capillary tube in the exchanged component is shorter in the axial direction than the previously used component, then the capillary tube is even deformed, possibly damaged, by the pressure of the attachment screw, and a tight connection is no longer possible in certain circumstances. This is because the sealing element mounted on the capillary tube with a positive-fit and non-positive-fit connection cannot move in the axial direction. However, in the case of such a fitting, a small dead volume also can be hardly avoided, if the end surfaces of the capillary tube and the line to be collected are directly opposite each other or contact each other, because the sealing position is not located in the region of the end surface of the capillary tube or the line to be connected.

In order to be able to compensate for such tolerances or in order to be able to use connection systems of different batches or manufacturers with one and the sample plug unit, a self-adjusting plug for high-performance liquid chromatography is described in U.S. Pat. No. 6,494,500 in which the capillary tube is biased axially in the direction toward the capillary tube receptacle openings of the bushing unit by means of a spring provided in the attachment screw. For the seal, an exchangeable ferrule is used that, however, has a conical construction again in its front region and interacts, for forming the seal, with an inner wall of the ferrule receptacle opening that has a more pronounced conical construction. Here, there is the risk again that the ferrule is "crimped tight" onto the capillary tube, especially when the sealing element is made from a metal, for example, stainless steel.

In addition, in this plug unit it is disadvantageous that a support element for the screw spring must be mounted on the capillary tube, wherein this support element makes the production of such a plug unit more complicated.

For avoiding a dead volume, a unit is known from U.S. Pat. No. 4,083,702 for connecting capillary tubes for gas chromatography in which the capillary tubes are similarly connected to each other with their end surfaces abutting. The capillary tubes are fixed by means of annular elements that are wedge shaped in the longitudinal section and that interact with corresponding conical recesses in the connection housing. In this case, however, the seal is simpler relative to a connection that is compatible with high-performance liquid chromatography, because, in the case of gas chromatography, the pressures that are used are significantly lower, for example, by up to 6 bar. There is no flexibility with respect to the use of the limit for different depths of the capillary tube receptacle borehole.

In addition to the already mentioned disadvantages, the known connection systems feature the disadvantage that the risk arises that the sealing element remains in place in the relevant receptacle opening of the bushing unit when the plug unit is dismounted and the capillary tube is pulled out from the bushing unit.

In addition, the trend in high-performance liquid chromatography is toward using thinner capillary tubes, because these can be more easily bent to better adapt them to the current installation conditions. Due to the production process, thinner capillary tubes also feature smaller tolerances in the inner diameter and smaller eccentricity of the inner diameter.

For using capillary tubes with smaller outer diameters in connection with conventional bushing units or connection units, these are provided at the ends with a sleeve for adapting the outer diameter to the diameter of the thicker conventional capillary tubes. However, this represents an additional expense and increases the dead volume of a connection. In addition, in the case of an unfavorable tolerance position, an additional dead volume between the sleeve and capillary tube could also be created.

U.S. Pat. No. 9,134,283 B2, incorporated herein by reference, describes a plug unit and system for connecting capillary tubes, especially for high-performance liquid chromatography, with a plug capillary tube projecting through a hole of a plug housing, which is detachably connectable to a bushing unit. The plug capillary tube front end projects into a capillary tube receptacle in the bushing unit with its end face essentially aligned opposite a front end of a bushing capillary tube or a bushing capillary passage opening of the bushing limit, the end face of which is butted against. The plug housing applies a force, with its end face facing the plug capillary tube end, directly or indirectly on an annular sealing element surrounding the plug capillary tube in the region of the front end of the plug capillary tube such that the front end of the plug capillary tube is sealed through deformation of the sealing element against the capillary tube receptacle opening.

U.S. Pat. No. 9,091,693 B3, incorporated herein by reference, describes a plug unit for connecting capillary tubes that includes a plug housing that has an axial borehole, a plug capillary tube that projects through the axial borehole, and a sealing element that surrounds the plug capillary tube. The front end of the plug capillary tube is sealed by an elastic and/or plastic deformation of the sealing element against the capillary tube receptacle opening of a bushing unit. A hollow cylindrical pressure piece is provided that surrounds the sealing element in an axial region facing away from the end surface of the plug capillary tube, and the pressure piece has a rearward end side that faces away from the end surface of the plug capillary tube and that can be loaded by the plug housing with an axial pressure force when the plug unit and bushing unit are connected.

The present invention is directed to a capillary tube connection for connecting capillary tubes, further advantageously for high-performance liquid chromatography, which can be used in a simple way for capillary tubes with different outer diameters in connection with bushing units with conventional diameters of receptacle openings. It can simultaneously offer the possibility of compensating different axial tolerances of receptacle openings in bushing units. In addition, when the plug unit is dismounted, it can be avoided that the sealing element detaches from the capillary tube and remains in the bushing unit. The present invention is also directed to a plug for such connection and a method for connecting capillary tubes

SUMMARY

The present invention is specified in the claims as well as in the below description. Preferred embodiments are particularly specified in the dependent claims and the description of various embodiments.

The present invention i.a. relates to a plug for connecting capillaries. The plug can be composed of different elements and components being assembled to an integral unit. A capillary is meant to be a fine bore, and preferably means a bore of not more than 500 μm. Capillaries can be used in a number of fields and the present invention can be applied in the field of HPLC.

The plug can comprise at least one capillary tube comprising at least one first inner diameter or bore and an open end section. Moreover, at least one generally plug-shaped sealing can be provided comprising at least one second inner diameter or bore. The sealing can have a first end section. The first end section is generally directed towards the capillary tube when being assembled. An opposing second end section of the sealing can be provided which can be generally directed away from the capillary tube to a bushing when being assembled. The end sections can comprise a portion or section of the sealing and a terminating surface or face of the sealing.

At least one pressure piece can be provided and adapted to exert at least axial pressure and/or force to at least a part of the sealing towards the second end section of the sealing and, in the finally assembled state, towards the bushing. The pressure piece can be adapted to host at least the first end section of the sealing in an aperture in abutment with the end section of the capillary tube when being assembled. The first inner diameter of the capillary tube and the second inner diameter of the sealing are preferably aligned so that any fluid can flow through them.

The present invention comprises different aspects which work alone and also in any combination. E.g., the sealing can comprise the first end section of generally convex shape adapted to seal the end section of the capillary tube when connected. Convex means that any major concave portions are not present. As will be seen there can be primarily minor grooves in the outer circumference of the sealing or can also be present in the face of the first end section of the sealing (not shown). Irrespective of this is the first end section of the sealing considered convex. This is particularly in contrast to the prior art showing major bores or cavities that would arranged in sections corresponding to the first end section of the sealing in the present invention, those major bores or cavities according to the prior art hosting a considerable part of an end section of a capillary tube.

The advantage of the present invention can be a compact, less complicated and reliable sealing. The sealing can be easier assembled, disposed and/or replaced by a new sealing.

An alternative or optionally additional aspect of the invention comprises at least one sealing having a first end section comprising a generally flat or flat face adapted to seal the end section of the capillary tube when connected. The end face of the capillary tube can then also be provided generally flat or flat so that the sealing abuts the capillary tube in easy and reliable fashion.

The advantage of the present invention can be a compact, less complicated and reliable sealing. The sealing can be easier assembled, disposed and/or replaced by a new sealing.

An alternative or optionally additional aspect of the present invention can be realized by the sealing comprising at least one second inner diameter being at least in part larger than the first inner diameter of the capillary tube when the sealing is in an uncompressed state. In case the capillary tube has one capillary or first inner diameter the sealing can also have at least one second inner diameter.

The advantage of the present invention can be a compact, less complicated and reliable sealing ensuring safe flow of fluid even when the sealing gets compressed during assembly of the plug and/or during assembly to a bushing.

An alternative or optionally additional aspect of the present invention can be at least one sealing comprising a maximum diameter being larger than a maximum axial length.

This can further contribute to the advantage of providing a compact, less complicated and reliable sealing. The sealing can be easier assembled, disposed and/or replaced by a new sealing.

An alternative or optionally additional aspect of the present invention can be realized by the sealing being of generally annular shape and having at least one radial groove and the pressure piece having at least one ridge engaging the radial groove of the sealing. The groove and ridge are not necessarily completely annular but can also be sections thereof.

This can further contribute to the advantage of providing a compact, less complicated and reliable sealing and a stable and/or reliable fixing of the sealing in the plug, preferably in the aperture of the pressure piece.

An alternative or optionally additional aspect of the present invention can be realized by the sealing being of generally annular shape and having a radial ridge and the pressure piece having a corresponding groove engaging the ridge of the sealing. The groove and ridge are not necessarily completely annular but can also be sections thereof.

This can further contribute to the advantage of providing a compact, less complicated and reliable sealing and a stable and/or reliable fixing of the sealing in the plug, preferably in the aperture of the pressure piece.

Any combination of two or more of the aspects described above and/or below can be provided as well.

According to an alternative or additional aspect the plug the pressure piece is adapted to host at least the first end section of the sealing in the aperture with an axial holding force of at least 80 N, preferably at least 100 N, more preferably at least 125 N, even more preferably at least 150 N. This can hold the sealing in the aperture in a manner so that the sealing is not accidentally removed when the plug is in the unassembled status or when it is removed out of a bushing and the sealing may adhere even firmly to the bushing. This can be obtained by a positive and/or elastic and/or frictional fitting between the sealing and the pressure piece.

The second end of the sealing can axially extend over the end section (43) of the pressure piece at least 0.2 mm, preferably at least 0.3 mm, even more preferably at least 0.35 mm and/or at most 0.6 mm, preferably at most 0.5 mm, more preferably at most 0.45 mm and most preferably 0.4 mm. This can allow sufficient elasticity and/or plastic deformation to that the sealing or the part extending over the end section of the pressure piece can elastically and/or plastically move radially outwardly when the plug is assembled.

The first inner diameter of the capillary tube can amount to at least 10 µm, preferably at least 20 µm, more preferably at least 30 µm, more preferably at least 40 µm, more preferably at least 50 µm, more preferably at least 100 µm, more preferably more than 200 µm.

The first inner diameter of the capillary tube can amount to at most 500 µm, preferably at most 400 µm, more preferably at most 300 µm, more preferably at most 200 µm, more preferably at most 100 µm, more preferably at most 50 µm, more preferably at most 30 µm.

The second inner diameter of the sealing can amount, particularly in an uncompressed state, can be at least 3%, preferably at least 4%, preferably at least 5%, preferably at least 6%, more preferably at least 8%, more preferably at least 10%, more preferably at least 12%, more preferably at least 15%, more preferably at least 20%, even more preferably at least 30% in part larger than the first inner diameter of the capillary tube. In part means at least one or more sections of the second inner diameter over its length, wherever radial stress, pressure, compression, forces, elastic and/or plastic deformation will happen or can be expected.

The largest diameter of the second inner diameter of the sealing, particularly in an uncompressed state, can be at most 100%, preferably 50%, more preferably at most 40%, more preferably at most 30%, more preferably at most 20%, more preferably at most 15%, more preferably at most 12%, more preferably at most 10%, more preferably at most 8%, more preferably at most 6%, even more preferably at most 5% larger than the first inner diameter of the capillary tube.

The second inner diameter of the sealing can open to an end face of the second section with a outwardly flared portion. The shape of that portion can also depend on the respective deformation to happen or to be expected.

The largest diameter of the outwardly flared portion of the sealing, particularly in uncompressed state, can be at least 3%, preferably at least 4%, more preferably at least 5%, more preferably at least 6%, more preferably at least 8%, more preferably at least 10%, more preferably at least 12%, more preferably at least 15%, more preferably at least 20%, even more preferably at least 30% in part larger than the first inner diameter of the capillary tube.

The largest diameter of the outwardly flared portion of the sealing, particularly in uncompressed state, can be at most 100%, preferably at most 50%, more preferably at most 40%, more preferably at most 30%, more preferably at most 20%, more preferably at most 15%, more preferably at most 12%, more preferably at most 10%, more preferably at most 8%, more preferably at most 6%, even more preferably at most 5% larger than the first inner diameter (21) of the capillary tube (20).

The maximum diameter of the sealing can be at least 1.1 times, preferably at least 1.2 times, more preferably at least 1.3 times, more preferably at least 1.4 times and even more preferably at least 1.5 times larger than the maximum axial length of the sealing.

The second end section of the sealing can comprise a larger average diameter than an average diameter of the first end section of the sealing being hosted in the pressure piece.

The average diameter of the second end section of the sealing can be at least 3%, preferably at least 4%, more preferably at least 5%, more preferably at least 6%, more preferably at least 8%, more preferably at least 10%, more preferably at least 12%, more preferably at least 15%, more preferably at least 20%, even more preferably at least 30% larger than the average diameter of the first end section of the sealing.

The first end section of the sealing can be crimped into an end section of the pressure piece, particularly by reducing the diameter of the end section of the pressure piece by mechanical means.

The first end section of the sealing can be fixed into an end section of the pressure piece by a positive and/or friction fit of the first end section of the sealing in the end section of the pressure piece.

The first end section of the sealing can be fixed into an end section of the pressure piece by an adhesive between the first end section of the sealing and the end section of the pressure piece.

The first end section of the sealing can be molded, preferably injection molded, into an end section of the pressure piece.

The average diameter of the first end section of the sealing can be at most 30%, more preferably at most 20%, more preferably at most 15%, more preferably at most 12%, more preferably at most 10%, more preferably at most 8%, more preferably at most 6%, even more preferably at most 5%, even more preferably at most 3%, even more preferably at most 2% larger than an outer diameter of the capillary tube.

The sealing can comprise or can be composed of PEEK (Polyetheretherketone) material and/or PAEK (Polyaryletherketone) material.

The invention is also directed to a sealing per se for a plug described before or below and/or claimed. The sealing can be generally plug-shaped and adapted to abut and seal an end section of a capillary tube by one first end section and to abut and seal an inner face of a bushing by a second end section opposite the first end section, and comprising at least one inner second diameter forming a capillary through the sealing and adapted to connect two opposing capillaries of a capillary tube and a bushing, respectively.

The sealing can comprise at least one second inner diameter being at least in part larger than the first inner diameter of the capillary tube when the sealing is in an uncompressed state.

The sealing can comprise at least one second inner diameter, the sealing further having a maximum diameter being larger than a maximum axial length. The further details of these proportions of the sealing are described above and claimed with respect to the plug.

The sealing can comprise or be composed of PEEK (Polyetheretherketone) material and/or PAEK (Polyaryletherketone) material.

The present invention is also directed to a bushing adapted to host a plug in accordance with the present invention.

The bushing can comprise an inner face for hosting the second end of the sealing when the plug is inserted in the bushing, the inner face having a maximum diameter of at least 1.4 mm, preferably at least 1.5 mm, more preferably at least 1.6 mm and/or at most 1.9 mm, preferably at most 1.8 mm and more preferably at most 1.7 mm. A plug host hosting the plug can be cylindrical bore or recess with the same inner diameter as the maximum diameter of the bushing's inner face. These dimensions can reduce the force needed to make the assembly fluid tight and thus reduce the respective handling forces by a user.

The present invention is further directed to a connection with the bushing and the plug as described and/or claimed.

Moreover, the present invention is directed to different aspects of methods for connecting capillaries. The methods comprise in any order the steps of providing at least one capillary tube comprising at least one first inner diameter and an open end section, providing at least one generally plug-shaped sealing comprising at least one second inner diameter, a first end section of generally convex shape adapted to seal the end section of the capillary tube when connected, providing at least one pressure piece adapted to exert at least axial pressure and/or force to at least a part of the sealing towards a second end section of the sealing oriented opposite to the first end section of the sealing, the pressure piece hosting at least the first end section of the sealing in an aperture in abutment with the end section of the capillary tube so that the first inner diameter of the capillary tube and the second inner diameter of the sealing are aligned.

Additionally or alternatively to providing a sealing with convex shape, the sealing can be provided with at least one second inner diameter being at least in part larger than the first inner diameter of the capillary tube when the sealing is in an uncompressed state according to a second aspect of the invention.

According to an optional or additional third aspect of the invention the sealing can be provided with a maximum diameter being larger than a maximum axial length.

According to an optional or additional fourth aspect of the invention the sealing is provided to be of annular shape and to have at least one radial groove and the pressure piece is provided to have at least one ridge engaging the groove of the sealing.

According to an optional or additional fifth aspect of the invention the sealing is provided to be of annular shape and to have at least one radial ridge and the pressure piece is provided to have at least one groove engaging the ridge of the sealing.

According to another aspect of the invention a method can alternatively or additionally comprise the steps of inserting the sealing into the pressure piece, moving the capillary tube into the pressure piece or vice versa until it reaches and/or abuts the sealing and crimping at least the pressure piece onto the capillary tube. The pressure piece can also be crimped onto the sealing as well.

The above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

DETAILED DESCRIPTION OF EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The same reference numerals used for different embodiments are intended to identify parts or features of different embodiments with the same or similar function. In case the same reference numerals are not identified in other embodiments, this is by no means intended to mean that the corresponding features designated by these reference numerals are not present.

Figure 1:
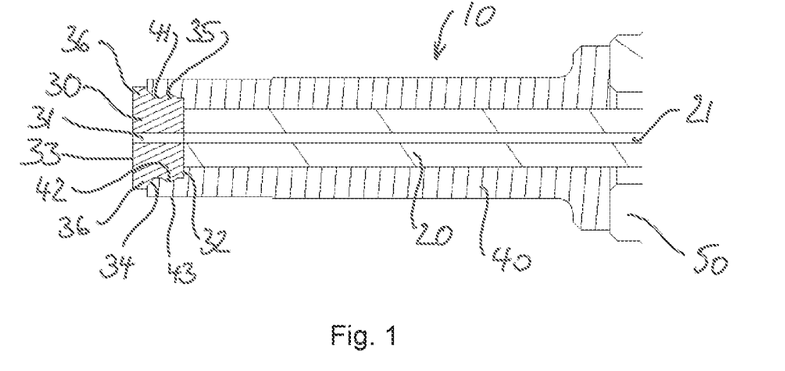
FIG. 1 shows an embodiment basically in a cross-section of a plug connection in accordance with the present invention.

FIG. 1 shows one possible arrangement of elements in a plug according to the present invention. A capillary tube 20 is arranged as a part of the plug 10. In the embodiment shown a plug fixing element 50 can be arranged in order to later fix the tube in a bushing (not shown). It can comprise an outer thread (not shown) or any other fixing element to fixedly but releasable arrange the plug in a bushing. As is apparent the plug-fixing element 50 can have an inner diameter, which is considerably larger than the outer diameter of the capillary tube 20 so that the fixing element 50 extends around the capillary tube 20 with some tolerance.

Moreover, a pressure piece 40 can be arranged on a further section of the capillary tube 20. It can be fixedly arranged on the pressure tube, e.g. by means of crimping/mechanical compression. The crimping can be performed in the area of the end of the capillary tube 20.

A sealing 30 can be arranged at the end of the plug and can abut an open end section 22 of the capillary tube 20 by a flat face or any other face.

The capillary tube 20 comprises a first inner diameter or capillary 21, which can extend centrally or not centrally through the capillary tube 20. The sealing 30 also has a second inner diameter 31 which can have a larger or slightly larger extent than the first inner diameter 21 of the capillary tube 20. This can also be realized at least in parts of the first inner diameter 21, such as the parts where any specific radial force is exerted onto the sealing 30 when being fixed and onto the respective section of the second inner diameter 31. One of such sections can be the outer end of the second inner diameter 31 where the inner diameter is located in a second end section 33 of the sealing. In FIG. 1 this is the left end of the second inner diameter 31. In this case a outwardly flared section in continuous or discontinuous form can be formed into the inner diameter 31. In case the second inner diameter 31 is reduced in case of any radial compression of the sealing 30 the enlarged portion of the inner diameter 31 or enlarged inner diameter 31 can compensate for that in view of the precautionary measure of diameter enlargement. When PEEK or PEAK material is used for the sealing, the flow of material may even equalize any difference in diameter as long as there is less material than in case of equal inner diameters 21, 31 in the capillary tube 20 and the sealing 30.

The sealing 30 may further comprise a first end section 32 being hosted by a corresponding aperture 41 in the pressure piece 40 when assembled. As highlighted, a generally convex structure of the sealing 30 towards the first end section 32 can provide a reliable, nevertheless compact sealing 30 which may even be replaced, if desired. In order to hold the sealing 30 in place in front of the capillary tube 20 and at least in part within the pressure piece 40 many techniques can be used. In the embodiment shown an end section 43 of the pressure piece 40 can be crimped onto the capillary tube 20 and also in part onto the sealing. A respective little step is shown in FIG. 1. Anyhow, additionally or alternatively there can be a positive, elastic or frictional lock between the sealing 30 and the pressure piece 40. As an example a groove 42 in the pressure piece 40 and a corresponding ridge 35 in the sealing 30 are shown engaging each other. A groove 34 in the sealing 30 can further support any axial and/or radial forces. In particular, an axial force applied by the pressure piece 40 can be also taken up into the sealing by the groove 34.

The face of the first end section 32 is flat or substantially flat. Alternatively it can comprise a structure or texture.

The second end section 33 of the sealing 30 can comprise an enlarged diameter forming a shoulder 36 or a plurality of shoulders. The end of the pressure piece 40 can abut the shoulder and find support there when the plug is inserted to form a connection. Then at least axial pressure is applied onto the shoulders 36 of the sealing in order to ascertain a proper or tight fit of the sealing 30 on a corresponding surface of a corresponding bushing (not shown).

Figure 2:
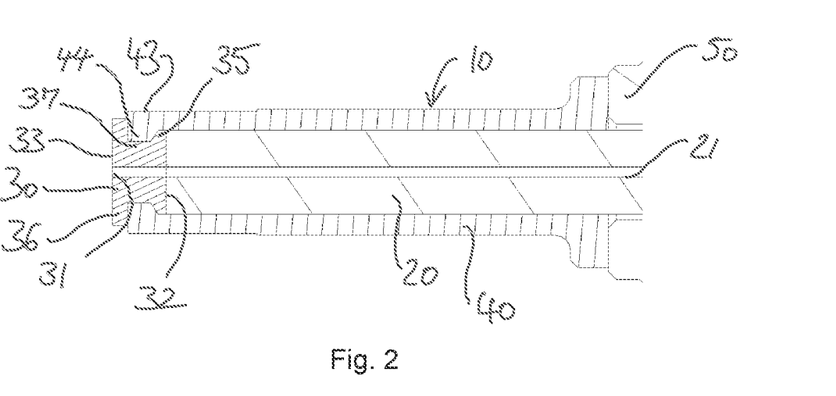
FIG. 2 shows another embodiment basically in a cross-section of a plug in accordance with the present invention.

FIG. 2 shows a similar structure as FIG. 1. The pressure piece 40 is shown with a ridge 44 and the sealing 30 has a corresponding groove 37. The ridge 44 can be annular (as shown) or interrupted. The groove 37 of the sealing 30 can be either of corresponding shape or of smaller shape so that a tight fit is realized when the sealing 30 is assembled to and/or into the pressure piece 40.

In the end section 43 of the pressure piece 40, a ridge 44, such as an annular radially inwardly convex ridge 44, can be provided engaging a corresponding groove 37 in the sealing 30 in positive fashion. In this case, a crimping as described before can be optionally implemented to fortify the connection.

The groove 37 can be inclined to the first end section 32 of the sealing and can expand into an annular sealing ridge 35. A vertical end of the groove 37 towards the second end section 33 of the sealing 33 can be realized in order to allow a flat and large surface support of the end of the pressure piece 40 against the shoulder 36.

This arrangement can allow a larger diameter of the capillary tube 20 relative to the sealing 30, particularly its second end section 33, and may even be aligned with it. This can provide a more compact and reliable sealing. This arrangement can alternatively allow a larger diameter of the inner diameter 31 of the sealing that is reduced in the assembled state and allows a continuous or almost continuous diameter when the capillary tube 20 is kind of continued by the inner diameter of the sealing's inner diameter 31.

Figure 3:
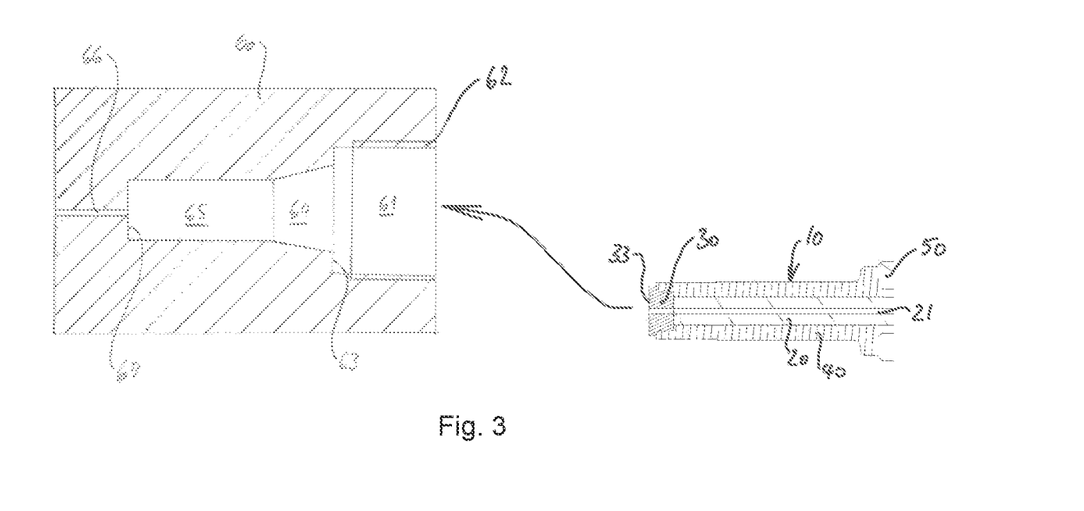
FIG. 3 shows a connection basically in cross-sections of a plug and a bushing in accordance with the present invention.

FIG. 3 shows a plug 10 as described before and a corresponding bushing 60 the plug 10 can rest in. The bushing 60 can be of any appropriate shape and is shown in a block format for illustrative simplicity.

In the cavities or apertures 61, 64, 65 the plug 10 can be inserted and fixedly secured, e.g., by screw threads not shown in the plug fixing element 50 but showing as screw threads 62 in the bushing 60. In the assembled condition the plug fixing element will be hosted in the cavity 61. An outwardly flared zone reduces the diameter between the cavity 61 and the plug host 65 which may also assist in inserting the plug 10 into the bushing 60. In the assembled condition the end face of the second end section 33 of the sealing will sealingly abut a corresponding inner face 67 of the bushing 60. Moreover, a bushing capillary 66 is formed in the bushing 60.

In the assembled state the bushing capillary 66, the second inner diameter 31 of the sealing and the first inner diameter 21 of the capillary tube are adapted to become aligned. The sealing 30 is then securely sealing the connection between the two capillary diameters.

Figure 4:
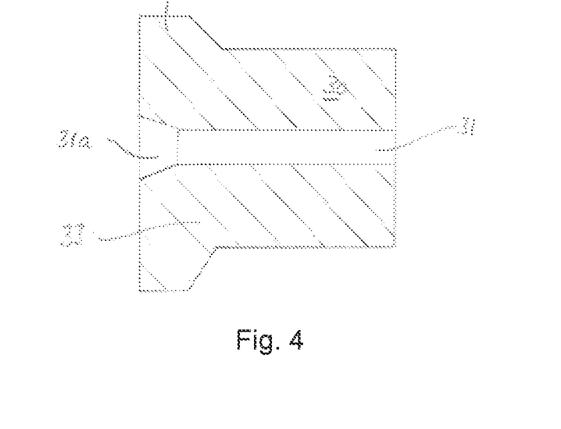
FIG. 4 shows a sealing in cross-section in accordance with the present invention.

FIG. 4 shows a cross-section through another preferred embodiment of a sealing 30 according to the present invention. The shoulder 36 and an outwardly flared portion 31a of the second inner diameter 31 are shown. In the assembled position the second end section 33 of the sealing will be pressed into a bushing (not shown) onto the inner face thereof. The outwardly flared and/or conical portion 31a allows a compensation for the contraction of the inner diameter 31 of the sealing 30 when the plug is fixedly secured in the bushing.

Figure 5:
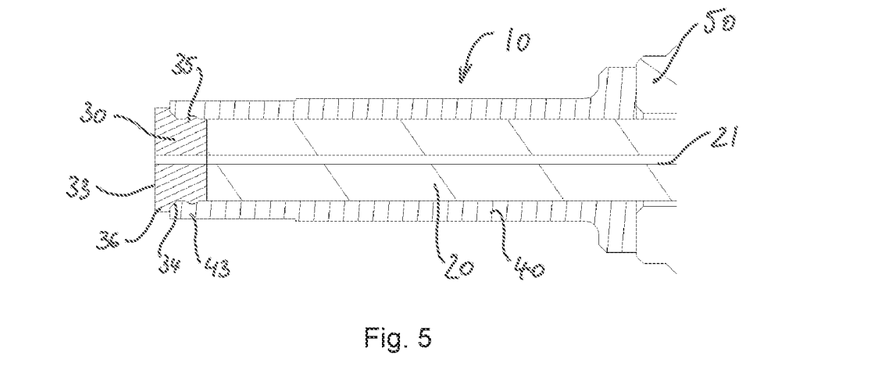
FIG. 5 shows another embodiment basically in a cross-section of a plug in accordance with the present invention.

FIG. 5 shows a further embodiment of a plug 10 similar to the one according to FIG. 1 but with a capillary 20 with a slightly larger or larger diameter. The pressure piece 40 can in this case exert the pressure by the topography of the end section 43 of the pressure piece 40 and the correspondingly shaped inner diameter of the sealing 30. Particularly the groove 34 of the sealing merging into the shoulder 36 can apply and/or convey any axial force from the pressure piece 40 into and/or onto the shoulder 36 when the plug is inserted in the bushing (not shown).

Figure 6:
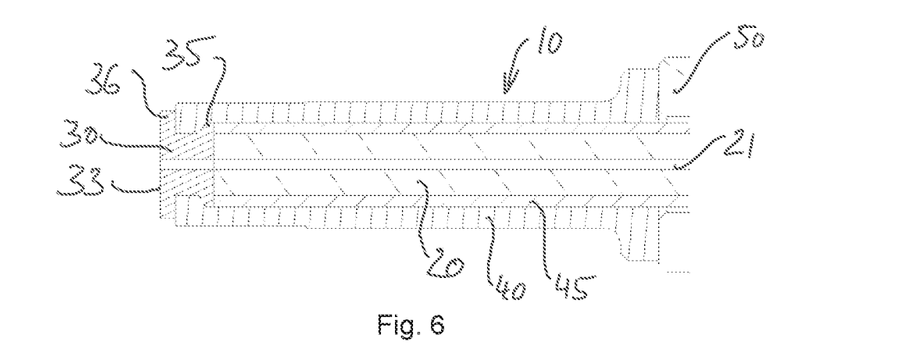
FIG. 6 shows another embodiment basically in a cross-section of a plug in accordance with the present invention.

FIG. 6 shows another embodiment with a further supporting structure 45. This supporting structure 45 can terminate together with the capillary 40 but doesn't have to. It can further abut the sealing 30, in particular the annular sealing ridge 35. This can provide another axial support and/or axial damping against any forces or impacts applied onto the capillary 40 and/or supporting structure 45 around it.

Figure 7:
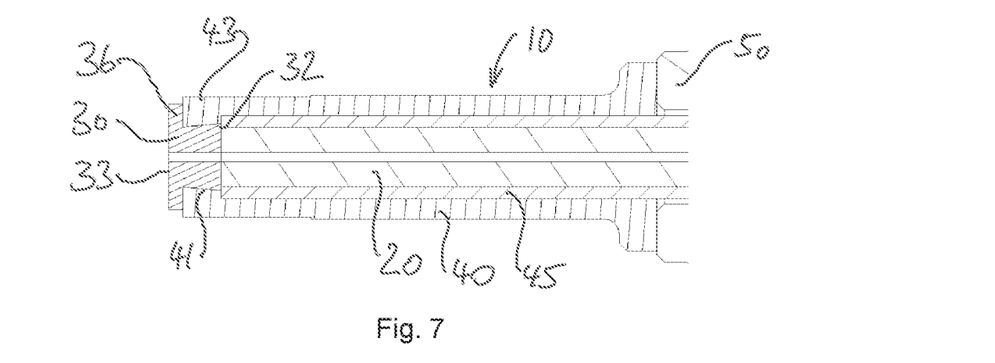
FIG. 7 shows another embodiment basically in a cross-section of a plug in accordance with the present invention.

FIG. 7 shows a further embodiment with a capillary 40 abutting against the sealing first end section 32 and a supporting structure 45 abutting against the sealing first end section 32. Towards the first end section 32 the diameter of the sealing can continuously increase, such as in a conical shape as shown or any other configuration. The pressure piece 40 can have a large surface support against the shoulder 36 of the sealing 30.

Figure 8:
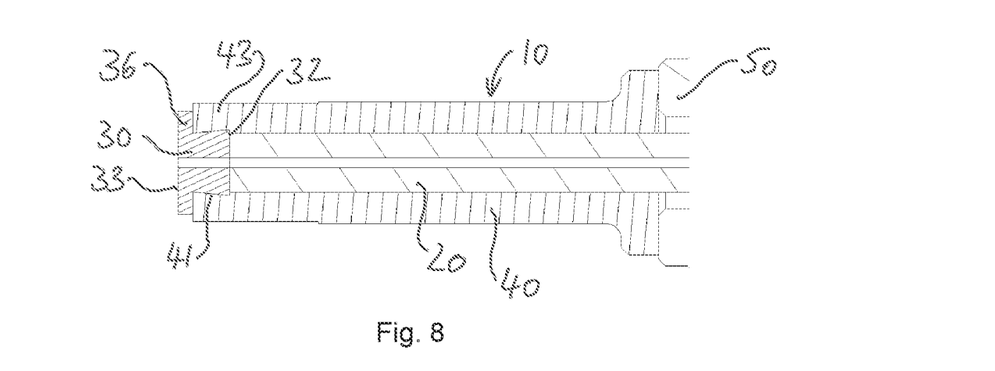
FIG. 8 shows another embodiment basically in a cross-section of a plug in accordance with the present invention.

FIG. 8 shows a similar structure as FIG. 7 with no supporting structure and the capillary 20 being surrounded by the pressure piece 40.

Figure 9:
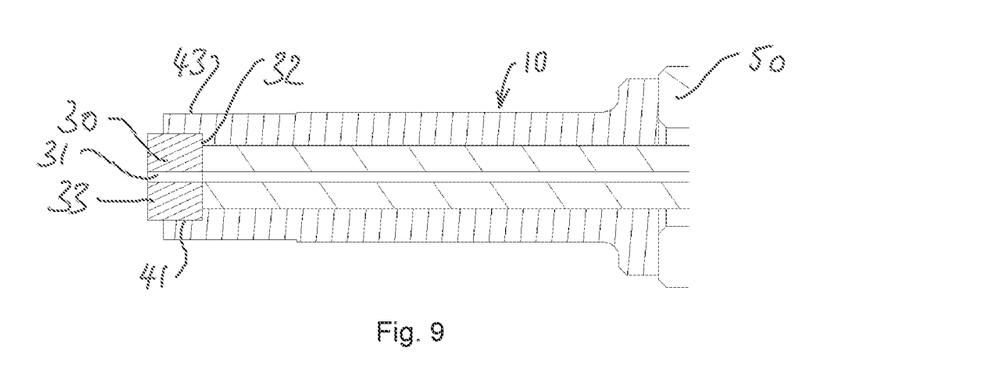
FIG. 9 shows another embodiment basically in a cross-section of a plug in accordance with the present invention.

FIG. 9 shows a basically cylindrically shaped sealing 30. The first end section 32 abuts a face in the pressure piece and/or the end of the capillary 20. As shown in all the other embodiments but not mandatory a crimping of the pressure piece in its end section 43 can further clamp or attach the sealing to the pressure piece 40.

Figure 10:
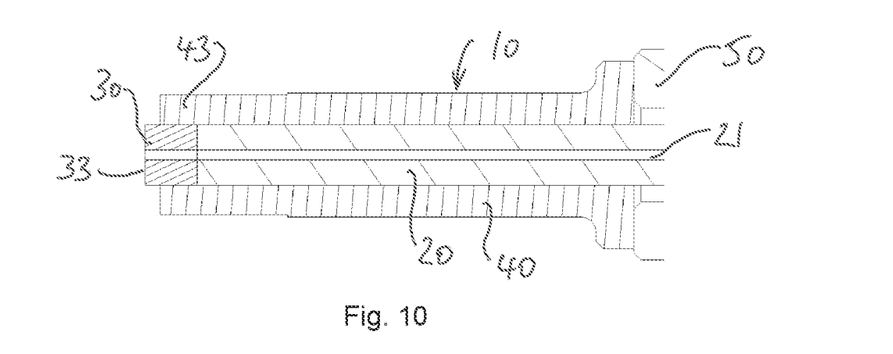
FIG. 10 shows another embodiment basically in a cross-section of a plug in accordance with the present invention.

FIG. 10 shows an attachment of the sealing within the inner space or diameter of the pressure piece in order to hold the sealing. As mentioned before, a crimping of the pressure piece 40 in its end section 43 can further support this.

The latter two figures particularly demonstrate that the end section 43 of the pressure piece 40 and the sealing 30 are adapted to make it necessary to apply a certain axial force to pull out the sealing 30 out of the pressure piece 40. Such axial forces have been specified in more detail before. In these figures frictional and/or elastical forces between the pressure piece ensure the holding of the sealing 30 within the pressure piece 40. In the embodiments before and below this axial force is further obtained by positive locking between the sealing 30 and the pressure piece 40.

Figure 11:
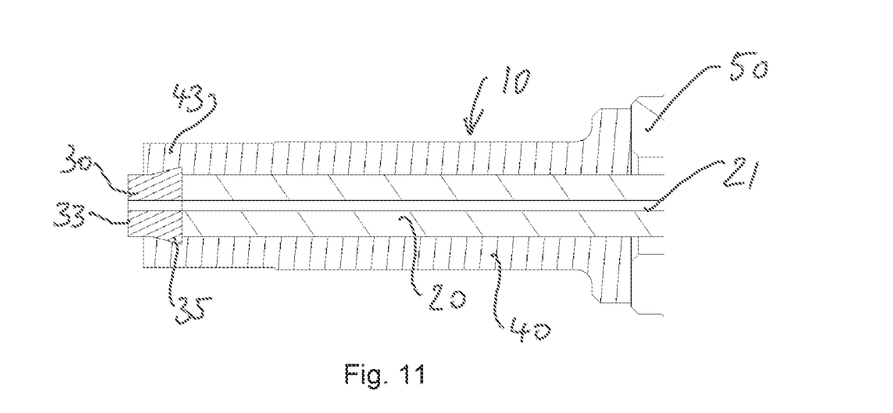
FIG. 11 shows another embodiment basically in a cross-section of a plug in accordance with the present invention.

FIG. 11 shows a sealing 30 with an inner ridge 35 formed by an increasing outer diameter of the sealing 30 starting to increase between the first end section and the second end section of the sealing and can start around half the widths thereof.

Reference numerals have just been referred to for reasons of quicker understanding and are not intended to limit the scope of the present invention in any manner.

What is claimed is:
1. A plug for connecting capillaries, the plug comprising:
 a) a capillary tube comprising a first inner diameter and an open end section;
 b) a supporting structure disposed on a portion of an outer surface of the capillary tube;

c) a sealing comprising a second inner diameter, a first end section, a second end section, and a convex shape, wherein the second end section is oriented opposite to the first end section; and
d) a pressure piece configured to exert an axial force to at least a part of the sealing towards the second end section, the pressure piece including an aperture, wherein the pressure piece is configured to host at least the first end section in the aperture, wherein an end face of the first end section is in abutment with the open end section of the capillary tube so that the first inner diameter of the capillary tube and the second inner diameter of the sealing are aligned, wherein the pressure piece is crimped onto the capillary tube.

2. The plug of claim 1, wherein the supporting structure abuts the sealing.

3. The plug of claim 1, wherein the pressure piece is crimped onto the sealing in order to hold the sealing.

4. The plug of claim 1, in which the open end section includes a flat face, and the first end section further comprises a flat face.

5. The plug of claim 1, in which the second inner diameter is at least in part larger than the first inner diameter of the capillary tube when the sealing is in an uncompressed state.

6. The plug of claim 1, in which the sealing includes a maximum diameter being larger than a maximum axial length.

7. A plug for connecting capillaries, the plug comprising:
a) a capillary tube comprising a first inner diameter and an open end section;
b) a supporting structure disposed on a portion of an outer surface of the capillary tube;
c) a sealing comprising a second inner diameter, a first end section, a second end section, an annular shape, and a radial groove, wherein the second end section is oriented opposite to the first end section; and
d) a pressure piece configured to exert an axial force to at least a part of the sealing towards the second end section, the pressure piece including an aperture and a radial ridge configured to engage the radial groove of the sealing, wherein the pressure piece is configured to host at least the first end section in the aperture, wherein an end face of the first end section is in abutment with the open end section of the capillary tube so that the first inner diameter of the capillary tube and the second inner diameter of the sealing are aligned, wherein the pressure piece is crimped onto the capillary tube.

8. The plug of claim 7, wherein the supporting structure abuts the sealing.

9. The plug of claim 7, in which the second end section of the sealing extends axially past an end section of the pressure piece by at least 0.2 mm and at most 0.6 mm.

10. The plug of claim 7, in which the first inner diameter of the capillary tube is at least 10 μm and is at most 500 μm.

11. The plug of claim 7, in which the second inner diameter of the sealing, in an uncompressed state, is at least 3% in part larger than the first inner diameter of the capillary tube and at most 100% larger than the first inner diameter of the capillary tube.

12. The plug of claim 7, in which the second inner diameter of the sealing opens to an end face of the second end section with an outwardly flared portion.

13. The plug of claim 12, in which a largest diameter of the outwardly flared portion of the sealing, in an uncompressed state, is at least 3% in part larger than the first inner diameter of the capillary tube and at most 100% larger than the first inner diameter of the capillary tube.

14. The plug of claim 7, in which a maximum diameter of the sealing is at least 1.1 times larger than a maximum axial length of the sealing.

15. The plug of claim 7, in which the second end section of the sealing comprises a larger average diameter than an average diameter of the first end section of the sealing being hosted in the pressure piece.

16. The plug of claim 15, in which the larger average diameter of the second end section of the sealing is at least 3% larger than the average diameter of the first end section of the sealing.

17. The plug of claim 7, in which the first end section of the sealing is crimped into an end section of the pressure piece by reducing a diameter of the end section of the pressure piece.

18. The plug of claim 7, in which the first end section of the sealing is fixed into an end section of the pressure piece by a friction fit of the first end section of the sealing in the end section of the pressure piece.

19. The plug of claim 7, in which the first end section of the sealing is fixed into an end section of the pressure piece by an adhesive between the first end section of the sealing and the end section of the pressure piece.

20. The plug of claim 7, in which the first end section of the sealing is injection molded into an end section of the pressure piece.

21. The plug of claim 7, in which an average diameter of the first end section of the sealing is at most 30% larger than an outer diameter of the capillary tube.

22. The plug of claim 7, in which the sealing comprises a material selected from the group consisting of a PEEK (Polyetheretherketone) material and a PAEK (Polyaryletherketone) material.

23. The plug of claim 7, in which the sealing is configured to abut and seal an inner face of a bushing by the second end section, and the bushing is adapted to connect the capillary tube and a bushing capillary.

24. A plug for connecting capillaries, the plug comprising:
a) a capillary tube comprising a first inner diameter and an open end section;
b) a supporting structure disposed on a portion of an outer surface of the capillary tube;
c) a sealing comprising a second inner diameter, a first end section, a second end section, an annular shape, and a radial ridge, wherein the second end section is oriented opposite to the first end section; and
d) a pressure piece configured to exert an axial force to at least a part of the sealing towards the second end section, the pressure piece including an aperture and a radial groove configured to engage the radial ridge of the sealing, wherein the pressure piece is configured to host at least the first end section in the aperture, wherein an end face of the first end section is in abutment with the open end section of the capillary tube so that the first inner diameter of the capillary tube and the second inner diameter of the sealing are aligned, wherein the pressure piece is crimped onto the capillary tube.

25. The plug of claim 24, wherein the pressure piece is crimped onto the sealing in order to hold the sealing.

26. A method for connecting capillaries, the method comprising:
inserting a plug into a cavity of a bushing, the plug comprising:

a) a capillary tube comprising a first inner diameter and an open end section;
b) a supporting structure disposed on a portion of an outer surface of the capillary tube;
c) a sealing comprising a second inner diameter, a first end section, a second end section, and a convex shape, wherein the second end section is oriented opposite to the first end section; and
d) a pressure piece configured to exert an axial force to at least a part of the sealing towards the second end section, the pressure piece including an aperture, wherein the pressure piece is configured to host at least the first end section in the aperture, wherein an end face of the first end section is in abutment with the open end section of the capillary tube so that the first inner diameter of the capillary tube and the second inner diameter of the sealing are aligned, wherein the pressure piece is crimped onto the capillary tube, the method further comprising:

securing the plug to the bushing where an end face of the second end section of the sealing sealingly abuts a corresponding inner face of the bushing.

27. The method of claim 26 further comprising:

applying an axial holding force of at least 80 N with the pressure piece to the sealing.

\* \* \* \* \*

UNITED STATES PATENT AND TRADEMARK OFFICE
CERTIFICATE OF CORRECTION

| | |
|---|---|
| PATENT NO. | : 11,714,067 B2 |
| APPLICATION NO. | : 17/218018 |
| DATED | : August 1, 2023 |
| INVENTOR(S) | : Thomas Wachinger et al. |

It is certified that error appears in the above-identified patent and that said Letters Patent is hereby corrected as shown below:

In the Claims

In Column 15, Claim 27, Line 23, delete "claim 26" and insert -- claim 26, --, therefor.

Signed and Sealed this
Fifth Day of September, 2023

Katherine Kelly Vidal
*Director of the United States Patent and Trademark Office*